(12) United States Patent
Hindle et al.

(10) Patent No.: US 9,322,278 B2
(45) Date of Patent: Apr. 26, 2016

(54) ARCHIMEDEAN SCREW APPARATUS

(75) Inventors: Neil Hindle, Heywood (GB); Bert Boersma, Heywood (GB)

(73) Assignee: SPAANS BABCOCK LIMITED, Heywood, Lancashire (GB)

(*) Notice: Subject to any disclaimer, the term of this patent is extended or adjusted under 35 U.S.C. 154(b) by 580 days.

(21) Appl. No.: 13/637,523

(22) PCT Filed: Mar. 4, 2011

(86) PCT No.: PCT/GB2011/000294
§ 371 (c)(1),
(2), (4) Date: Nov. 21, 2012

(87) PCT Pub. No.: WO2011/117564
PCT Pub. Date: Sep. 29, 2011

(65) Prior Publication Data
US 2013/0302174 A1 Nov. 14, 2013

(30) Foreign Application Priority Data
Mar. 26, 2010 (GB) .................................. 1005140.7

(51) Int. Cl.
*F04B 19/12* (2006.01)
*F01D 5/14* (2006.01)
*F03B 7/00* (2006.01)

(52) U.S. Cl.
CPC . *F01D 5/141* (2013.01); *F03B 7/00* (2013.01); *F04B 19/12* (2013.01); *F05B 2240/243* (2013.01); *Y02E 10/223* (2013.01)

(58) Field of Classification Search
CPC ..... B63H 2001/122; F01D 5/141; F03B 7/00; F04B 19/12

USPC ....................... 416/241 R, 241 A, 227 A, 224
See application file for complete search history.

(56) References Cited

U.S. PATENT DOCUMENTS

| | | | |
|---|---|---|---|
| 3,135,377 A | | 6/1964 | Miley |
| 5,333,762 A | * | 8/1994 | Andrews ........................ 222/238 |
| 5,494,579 A | * | 2/1996 | Robatel et al. .............. 210/380.1 |
| 6,716,153 B2 | * | 4/2004 | Stroucken et al. .............. 494/53 |

FOREIGN PATENT DOCUMENTS

| | | | | |
|---|---|---|---|---|
| EP | 0393564 A1 | | 10/1990 | |
| EP | 1930597 A2 | * | 6/2008 | .............. F03B 3/103 |

(Continued)

OTHER PUBLICATIONS

International Search Report for corresponding International Application No. PCT/GB2011/000294.

*Primary Examiner* — Igor Kershteyn
*Assistant Examiner* — Woody A Lee, Jr.
(74) *Attorney, Agent, or Firm* — Egbert Law Offices, PLLC

(57) ABSTRACT

An Archimedean screw apparatus for use either in power generation or for the pumping or conveying of fluid material includes a screw body formed by a shaft and at least one helical flight that is located in a close-fitting channel structure. The screw body is rotatably mounted such that the flight is in frictional contact with in inner surface of the channel. The weight of the screw body is borne at least partially by the channel structure and is dissipated fully or partially along the length of channel structure. Hence, preferably the Screw both is either provided with only a single bearing located at one end of the shaft, the other end being left floating within the channel structure, or the screw body is not provided with any bearings and the shaft is connected directly to a drive mechanism or to part of a power generating apparatus.

19 Claims, 5 Drawing Sheets

(56) References Cited

FOREIGN PATENT DOCUMENTS

| GB | 965444 | A | * | 7/1964 | ............ | F04B 19/12 |
| GB | 1040207 | A1 | * | 5/1965 | ............ | F04B 19/12 |
| GB | 1040207 | A | | 8/1966 | | |

* cited by examiner

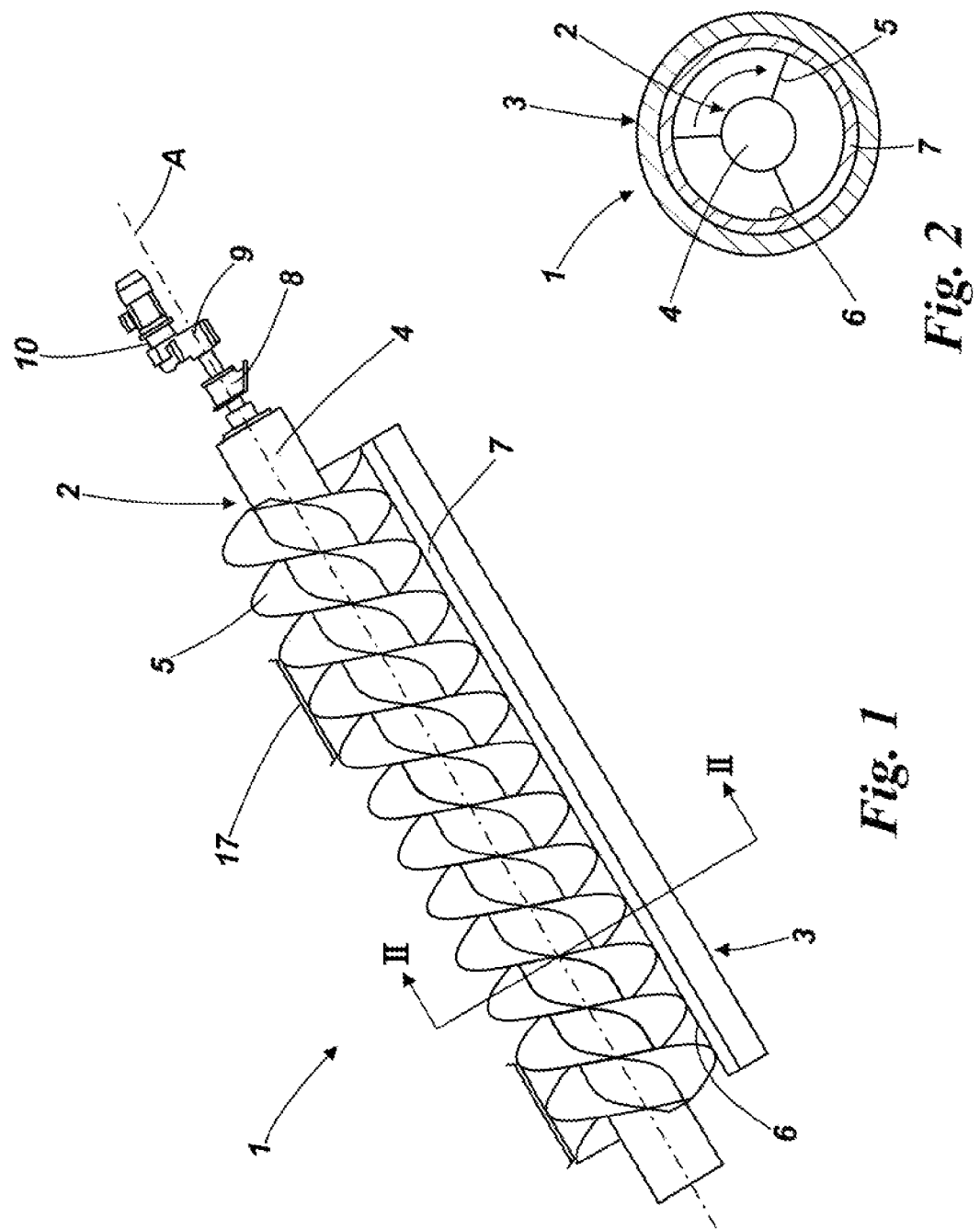

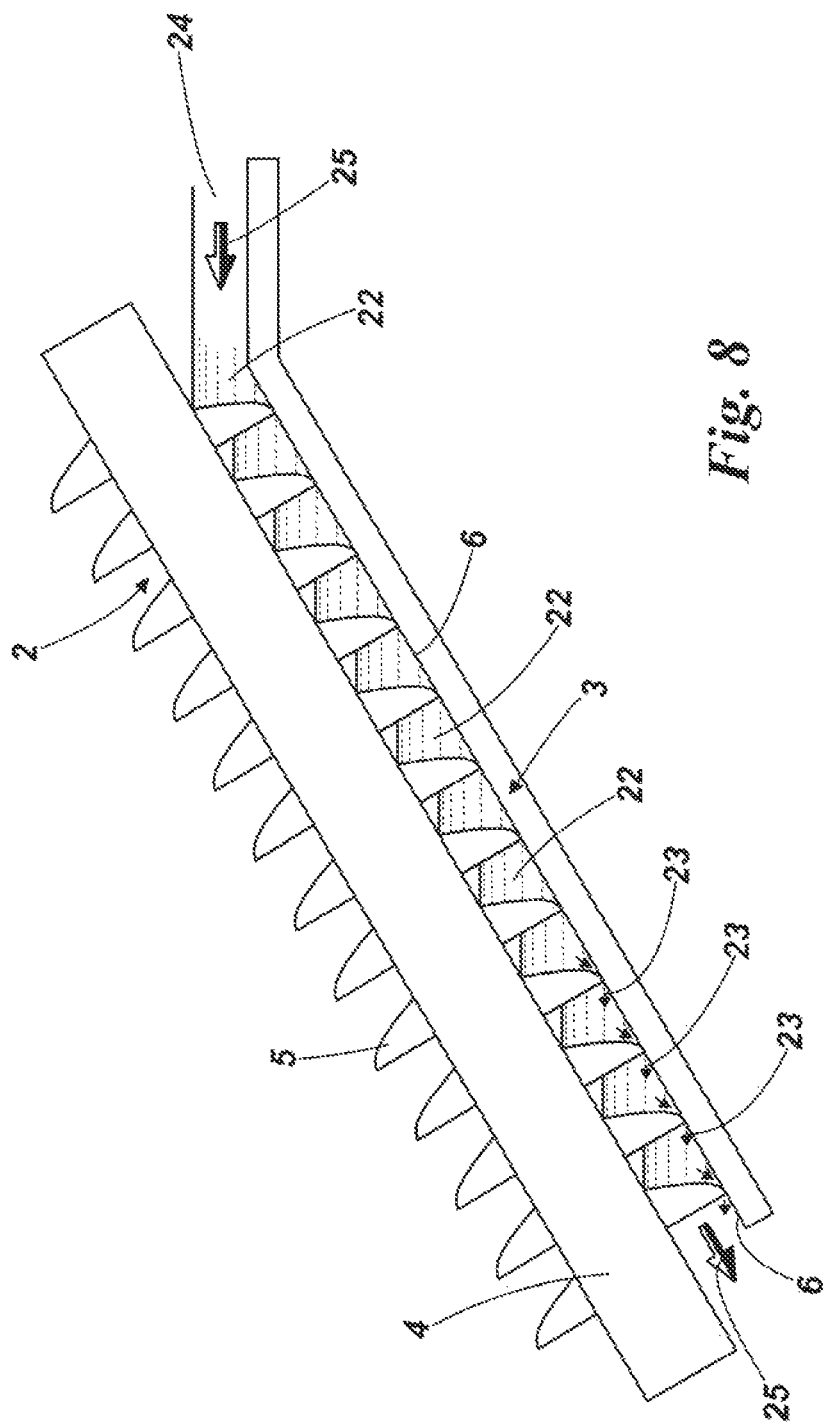

ARCHIMEDEAN SCREW APPARATUS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to an Archimedean screw apparatus for use either in power generation or in the pumping or conveying of fluid material.

2. Description of Related Art Including Information Disclosed Under 37 CFR 1.97 and 37 CFR 1.98.

Conventionally, a modern Archimedean screw apparatus comprises a screw body having a rotatable shaft around which is secured one or more helical flights. The shaft is suspended at its ends between bearings, typically a drive-end bearing and a non drive-end bearing, in a close fitting trough and a small clearance is left between the flights and the trough or a liner located in the trough. In a pumping apparatus, the trough is either horizontal or inclined and the shaft is driven to pump material along the trough, from the bottom to the top if it is inclined. In contrast, in power generation the trough is inclined and fluid flows down the trough under gravity to rotate the screw body, which is linked to a generator. Power to or torque from the screw body is therefore transmitted by the shaft and it is important that the length and strength of the shaft are chosen so that the screw body is sufficiently strong to remain suspended without serious bending or deflection, which would create undue stresses in the screw body and cause contact with the trough. Hence, the longer the screw body the stronger it needs to be to withstand the bending moments to which it is subjected.

BRIEF SUMMARY OF THE INVENTION

The object of the present invention is to provide an Archimedean screw apparatus in which the bending loads on the screw body are removed or significantly reduced enabling the strength required in the screw body to be made substantially independent of its length.

According to the present invention there is provided an Archimedean screw apparatus comprising a screw body formed by a shaft and at least one helical flight located in a close-fitting channel structure, the screw body being rotatably mounted such that the flight is in frictional contact with an inner surface of the channel structure.

In this apparatus, as the flight or flights of the screw body are in contact with the inner surface of the channel structure the weight of the screw body is borne at least partially by the channel structure and is dissipated fully or partially along the length of channel structure. This means that the screw body can be made of lightweight materials, such as plastics and the like which also has the effect of reducing the load between the tips of the flight or flights and the inner surface of the channel structure.

Preferably, the channel structure comprises a trough, an open channel, a closed channel or a tube.

Preferably, the screw body comprises a plurality of up to seven flights. In practice, for ease of construction the screw body is most likely to be provided with three or four flights.

Preferably also, the screw body is provided with a single bearing located at one end of the shaft Advantageously, the other end of the screw body floats within the channel structure.

Alternatively, the shaft is connected directly to a drive mechanism or to part of a power generating apparatus.

Preferably also, means are provided to retain the screw body in position within the channel structure.

Preferably also, the screw body is either buoyant or is made at least partially from a buoyant material. This means that the screw body will tend to float, in use, in fluid material passing through the apparatus and allow a small passage of the fluid between tips of each flight and the adjacent inner surface of the channel that will lubricate the rotation of the screw body.

Advantageously, the means retaining the screw body in position comprises an anti-flotation means.

Preferably also, the inner surface of the channel structure is defined by a liner. Advantageously, the liner is detachable from the channel structure.

Further preferred but non-essential features of the various aspects of the present invention are further described in the dependent claims appended hereto.

BRIEF DESCRIPTION OF THE DRAWINGS

The present invention will now be described by way of example with reference to the accompanying drawings, in which:

FIG. 1 is a schematic side view of a first embodiment of Archimedean screw apparatus according to the present invention arranged for the pumping or conveying of fluid material, a channel structure of the apparatus being shown in longitudinal cross-section to reveal the structure of a screw body of the apparatus;

FIG. 2 is a transverse cross-sectional view of a second embodiment of Archimedean screw apparatus according to the present invention along a line equivalent to the line II-II in FIG. 1;

FIG. 8 is a longitudinal cross-sectional view showing schematically an embodiment of an Archimedean screw apparatus similar to that shown in FIG. 1 when in use for power generation of the assembly of a panel on a framework with the device of the invention.

DETAILED DESCRIPTION OF THE INVENTION

Figure 3:
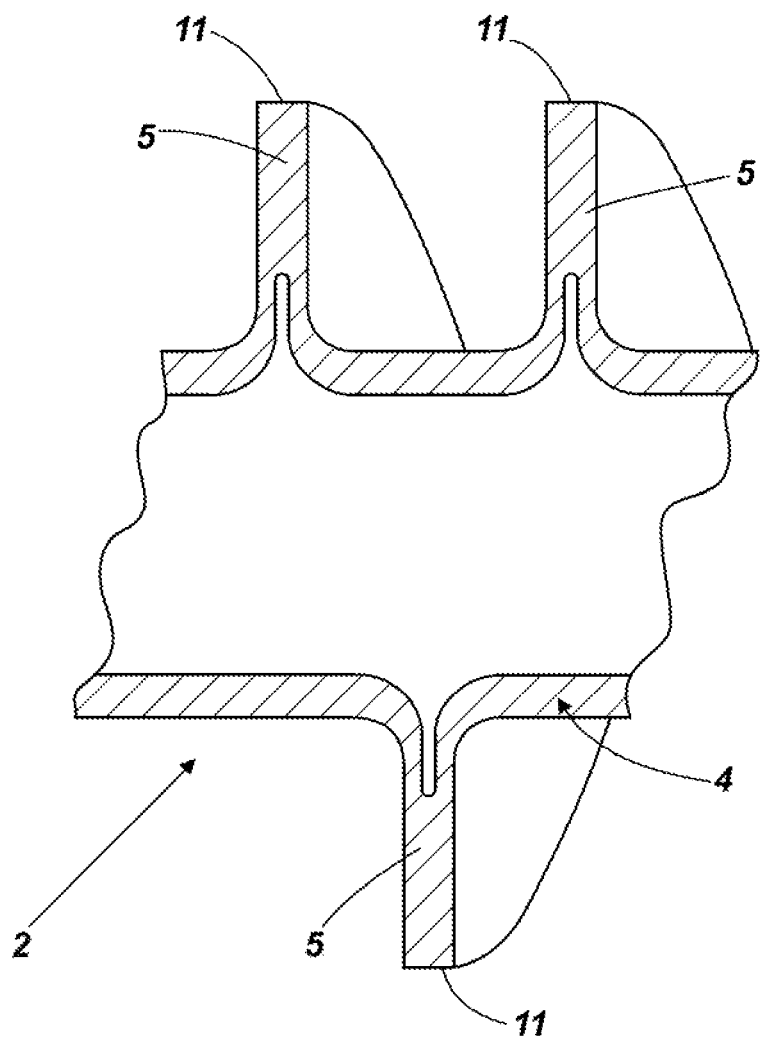
FIG. 3 is a longitudinal cross-sectional view, to an enlarged scale in comparison to FIGS. 1 and 2, of part of a screw body for use in an Archimedean screw apparatus according to the present invention.

With reference to FIG. 1, a first embodiment of Archimedean screw apparatus 1 in accordance with the present invention comprises a screw body 2 which is located in a close-fitting channel structure 3. The screw body 2 is formed by a shaft 4 and at least one helical flight 5 that is secured to or integrally formed with the shaft 4, as is further described below. In all of the drawings, the screw body 2 is shown having three helical flights 5. However, it should be appreciated that the screw body 2 of an apparatus in accordance with the invention may comprise one or any number of flights, typically seven being the optimal number for efficiency. However, for ease of construction in most practical applications of the apparatus 1 the screw body will comprise three or four flights 5.

Figure 5:
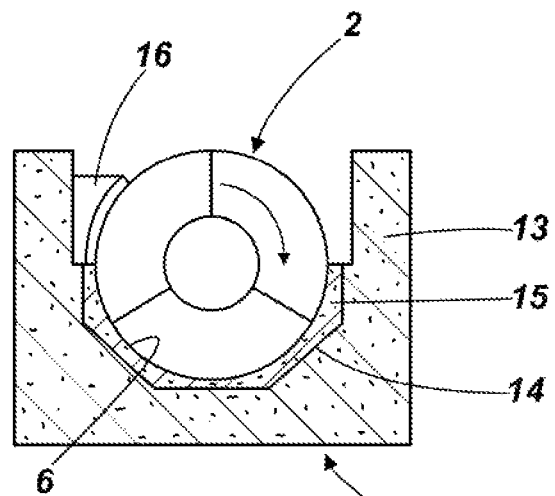
FIGS. 5 to 7 are views similar to FIG. 2 of alternative embodiments in accordance with the present invention.
Figure 6:
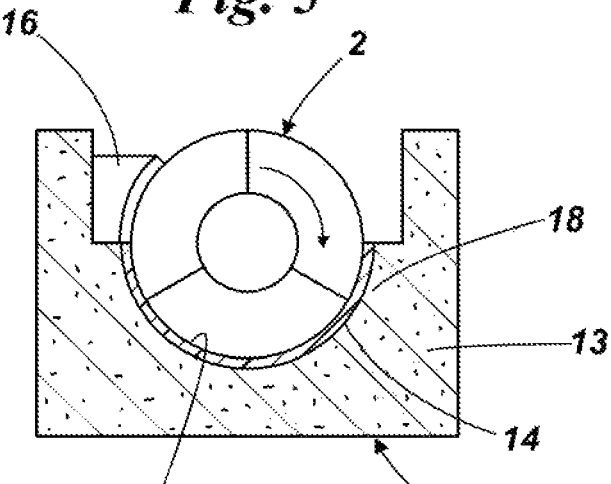
Figure 7:
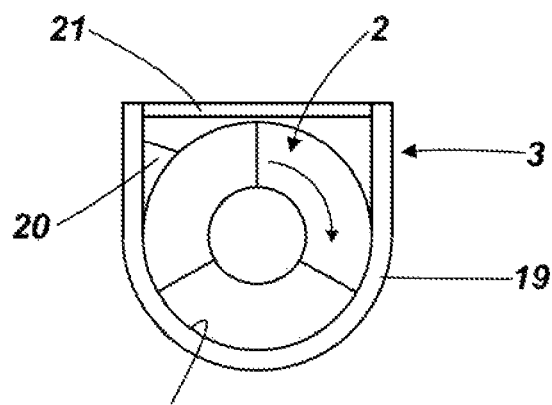

The channel structure 3 defines a channel with a semi-cylindrical inner surface 6 adjacent the screw body 2 that may be formed by a liner 7 located in the channel or, alternatively, the surface of the channel itself. The screw body 2 is rotatably mounted along its longitudinal axis A with the flights 5 in frictional contact with the inner surface 6 so that it runs under normal circumstances in contact with the channel structure 3, which thereby provides longitudinal support and alignment to the screw body 2. In FIG. 1 the channel structure 3 comprises an open trough or channel but in the embodiment shown in FIG. 2 the channel structure 3 comprises a cylindrical tube that completely encloses the screw body 2, there being no discernible gap between the tips of the flights 5 and the liner 7. In a modification, the liner 7 may be omitted and the screw body 2 mounted in direct frictional contact with the surface of the tube. In other embodiments, the channel structure 3 may comprise a trough, an open channel or a closed channel and various of these arrangements of channel structure 3 are shown in FIGS. 5 to 7.

FIG. 1 shows an apparatus 1 suitable for the pumping or conveying of fluid material, by which is meant a readily flowing liquid or liquid-based material such as water, river water, sewage or like materials. Here, the shaft 4 is supported at its upper end in a drive-end bearing 8 and is linked via a coupling 9 to a drive unit 10 comprising gears and a motor. However, the lower, non-drive end of the shaft 4 is not supported in a bearing and effectively floats within the channel structure 3.

In order to reduce the load on the channel structure 3 and to reduce friction created when the shaft 4 is rotated by the drive unit 10, the screw body 2 can be made from lighter-weight material than would be possible in a conventional apparatus. This is because the screw body 2 is not subjected to the same bending moment along its length as a conventional screw body and dissipates its weight at least partly along the length of the channel structure 3. In view of this in some embodiments it is possible to dispense with the bearing 8 and to couple the shaft 4 directly to the drive unit 10 or to a power generating unit. Alternatively, drive-end and non-drive end bearings can still be provided but the reduced load of the screw body 2 means that the bearing size and strength used can also be reduced, with consequent cost savings.

In the embodiments shown in FIGS. 1 and 2, the screw body 2 is fabricated from metal and comprises a hollow shaft 4 to the exterior of which three helical flights 5 are welded. In a modified, stronger arrangement, the helical flights 5 are pressed into the body of the shaft 4 and welded into position. However, the present invention opens up the possibility of the screw body 2 being made in many other ways and from lightweight materials such as plastics. The channel structure 3, or at least the liner 7, may also be made from similar materials and various of these are described below with reference to FIGS. 5 to 7. The screw body 2 may be made, for example, by fabrication, moulding, injection moulding, rotary moulding casting or from glass reinforced plastics. In such cases, the screw body 2 may be buoyant during use. This may be because it is a hollow structure and/or because it is made from a buoyant material. Such a screw body 2 has the advantage that it decreases the surface loadings on the tips 11 of the flights 5 of the screw body 2 leading to less friction and a reduction in wear of the flights 5 and the liner 7 or surface 6 of the channel structure 3.

Figure 4:
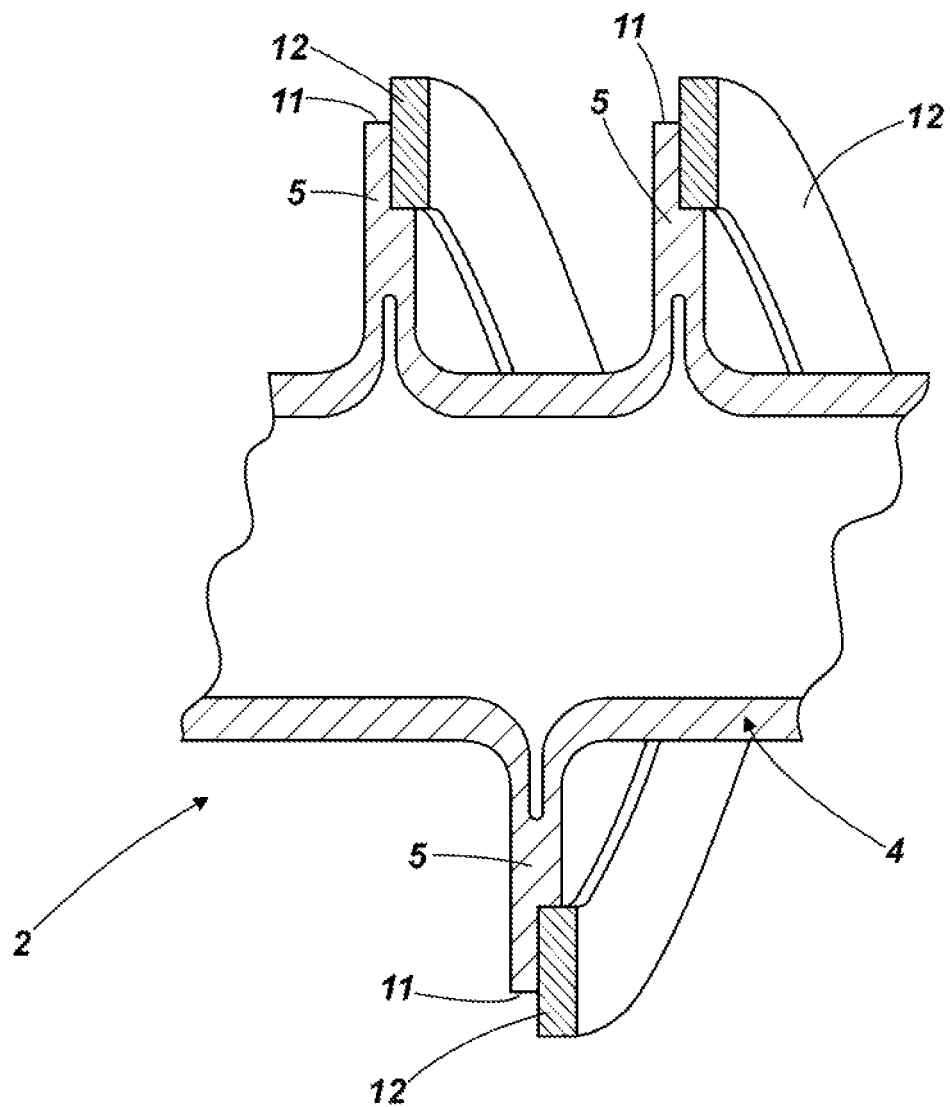
FIG. 4 is a view similar to FIG. 3 but of an alternative construction of screw body.

FIG. 3 shows part of a screw body 2 wherein the shaft 4 and three flights 5 have been integrally moulded in one piece from a plastics material such as, for example, nylon, polyethylene or polypropylene, all of which have a high wear resistance. Conventional moulding techniques can be used for this purpose. As can be seen, the flights 5 are integrally formed with a central tube that forms the shaft 4. In a modification as shown in FIG. 4, the tips 11 of the flights 5 are provided with separately produced ribs 12 that are secured to the tips 11, for example by mechanical fixing, welding or bonding. The ribs 12 can be made of a more wear resistant material than the flights 5 as they are in frictional contact with the inner surface 6 of the channel structure 3. Preferably, therefore, the ribs 12 are secured to the flights 5 so that they can be readily replaced should they become worn or damaged. The use of replaceable ribs 12, either made or plastics or otherwise, could also be used with metal flights 5. The use of plastics ribs 12 with such flights 5 will reduce the friction between the screw body 2 and the inner surface 6 of the channel structure 3, particularly if a plastics liner 7 is also used.

The liner 7 is preferably removable from the channel structure 3 and therefore replaceable. It can be made of any suitable material and may, for example, be a moulded structure or a sheet that conforms to the contours of the inner surface 6 of the channel structure 3. If the liner 7 is readily replaceable, in general it is better to use different plastics materials for the liner 7 and the flights 7 such that the liner 7 is sacrificial. This is because in many embodiments, it is easier and less expensive to replace a worn liner 7 than worn flights 5 or ribs 12. However, in some embodiments it may be better if the plastics used for both the ribs 12 and the liner 7 are the same.

Reference will now be made to FIGS. 5 to 7 which show alternative embodiments of channel structures 3 suitable for use in an apparatus according to the invention. In FIG. 5 the channel structure comprises an outer concrete structure 13 formed with channel defining an angled inner surface 14 over which is laid a smooth concrete grout 15 that forms the semi-cylindrical channel surface 6. Above the grout 15 on one side of the channel is a separate profile 16, that can be made of metal or plastics and that also conforms to the outer profile of the screw body 2. This profile 16 is secured to the channel structure 3 on the side where the flights 5 rise upward. During use of the apparatus 1, the profile 16 acts as a baffle to retain liquid material passing through the apparatus 1 within the channel structure as it tends to be carried upwards by the flights 5. The profile 16 is usually detachable from the channel structure 3 to provide access to the screw body 2 and the interior of the channel for maintenance purposes.

A second profile 16 may also be provided on the opposite side of the channel structure 3 and together they may act to retain the screw body 2 within the channel structure 3, as in the present invention the screw body 2 is not necessarily held in position by bearings. This is important for two reasons. First, to prevent movement or removal of the screw body 2 by external forces or by unauthorized persons. Second, if the screw body 2 is buoyant when the apparatus is in use, the screw body 2 will tend to float away from the inner surface 6 of the channel structure and decrease the surface loadings on the tips of the flights 11. However, it will be appreciated that the efficiency of the screw apparatus will suffer if the screw body 2 is permitted to float too far out of position. Hence the need for an anti-flotation means. This means may take the form of one or more profiles 16 or of a separate an anti-flotation bracket 17, such as shown in FIG. 1, which is provided for the same reason. The bracket 17 holds the screw body 2 in place without necessarily conforming to the outer profile of the screw body 2. It with be appreciated that with a tubular channel structure 3, as shown in FIG. 2, in which the screw body 2 is closely fitted, such a profile 16 or bracket 17 would not be required, the structure 3 itself retaining the screw body 2 in position.

FIG. 6 shows a channel structure 3 with a similar outer concrete structure 13 to that shown in FIG. 5 except that the channel surface 14 is made semi-cylindrical. This surface is covered by a removable plastics liner 18 that can be either moulded to fit over the channel surface 14 or comprise a flexible sheet material that moulds itself to the surface 14.

FIG. 7 shows a channel structure 3 in the form of a U-shaped channel 19, made or metal or plastics, in which the screw body 2 is a snug fit. The screw body 2 is located directly in contact with the bottom of the channel 19, which is also provided with a detachable profile 20 and a removable lid 21 so that the screw body 2 is completely contained within the structure 3. The lid 21 may also comprise an anti-flotation means that retains the screw body 2 in position.

In use, the screw body 2 rotates within the channel structure 3 and there tends to be a small passage of fluid material 22 between the tips of the flights 5 and the inner surface 6 of the channel structure 3, as indicated by the arrows 23 in FIG. 8. There is an advantage in such a passage of fluid which is that it lubricates the tips 11 of the flights 5 as they move over the surface 6. This leads to a lower frictional resistance and thus a lower wear rate of the flights 5 of the screw body 2 and/or ribs 12 and of the liner 7 or channel structure 3 in general. FIG. 8 shows a screw apparatus when in use for power generation. Hence, the direction of flow of the fluid material 22 is downwards from an inlet 24 at the top of the channel structure 3, through the screw apparatus itself, and out at the bottom, as indicated by the large arrows 25. The fluid flow rotates the screw body 2, which is linked to a generator (not shown). No bearings are shown in FIG. 8 and none may be required but a bearing may be provided at an upper end of the screw body 2 to accommodate thrust load. It is not expected that any bearing would be required at the lower end of the screw body 2.

A similar passage 23 of fluid material 22 will occur in all of the aforementioned embodiments. In those cases where the screw body 2 is buoyant, there may be a greater passage of fluid than in other cases but this can be controlled by use of an anti-flotation means such as the bracket 17 or by use of a tubular channel structure 3, as shown in FIG. 2.

Hence, it will be appreciated that in an Archimedean screw apparatus according to the invention the bending loads on the screw body are removed or significantly reduced enabling the strength required in the screw body to be made substantially independent of its length. This means that the screw body can be made of lighter-weight material than hitherto, including plastics material, which make the production of such a screw body 2 both simple and relatively inexpensive.

We claim:

1. An Archimedean screw apparatus for generating or pumping, the Archimedean screw apparatus comprising:
a screw body defining a length and having a shaft and at least one helical flight positioned in a horizontal or inclined close-fitting channel structure, said shaft being supported and an opposite end of said shaft being unsupported, said screw body being rotatably mounted such that the helical flight is in frictional contact with said inner surface of the channel structure, said inner surface of said channel structure longitudinally supporting and aligning said screw body along the length of said screw body.

2. The Archimedean screw apparatus of claim 1, said screw body having more than one helical flight and having no more than seven helical flights.

3. The Archimedean screw apparatus of claim 1, said channel structure being a trough.

4. The Archimedean screw apparatus of claim 1, said channel structure being an open channel.

5. The Archimedean screw apparatus of claim 1, said channel structure being a closed channel.

6. The Archimedean screw apparatus of claim 1, said channel structure being a tube.

7. The Archimedean screw apparatus of claim 1, said screw body having a single bearing at said one end thereof.

8. The Archimedean screw apparatus of claim 1, said screw body having no bearings.

9. The Archimedean screw apparatus of claim 1, further comprising:
a drive mechanism directly connected to said shaft.

10. The Archimedean screw apparatus of claim 1, further comprising:
a power generating apparatus, said shaft connected to a part of said power generating apparatus.

11. The Archimedean screw apparatus of claim 1, said screw body retained in position within said channel structure.

12. The Archimedean screw apparatus of claim 1, said screw body at least partially formed of a polymeric material.

13. The Archimedean screw apparatus of claim 12, said screw body being retained in position by an anti-floatation bracket.

14. The Archimedean screw apparatus of claim 1, said shaft and the said at least one helical flight being integrally formed together.

15. The Archimedean screw apparatus of claim 14, said flight having a detachable rib at a tip thereof.

16. The Archimedean screw apparatus of claim 15, said channel structure having a liner defining said inner surface thereof, said liner being formed of a material identical to a material that forms said detachable rib.

17. The Archimedean screw apparatus of claim 1, said channel structure having a liner defining said inner surface thereof.

18. The Archimedean screw apparatus of claim 17, said liner being detachable from said channel structure.

19. The Archimedean screw apparatus of claim 17, said liner being formed of a material identical to a material that forms the helical flight.

* * * * *